United States Patent [19]
Jensen et al.

[11] 3,903,521

[45] Sept. 2, 1975

[54] SIMULATOR OF RADAR RETURN SIGNALS FROM AN ACCELERATING TARGET

[75] Inventors: Garold K. Jensen, Pinecrest, Va.; James E. McGeogh, Silver Spring, Md.

[73] Assignee: The United States of America as represented by the Secretary of the Navy, Washington, D.C.

[22] Filed: July 9, 1964

[21] Appl. No.: 381,590

[52] U.S. Cl. ............................................. 343/17.7
[51] Int. Cl. ............................................. G01s 7/40
[58] Field of Search ....... 35/10.4; 343/17.7; 331/78, 331/106, 172, 178

[56] References Cited
UNITED STATES PATENTS
2,952,015  9/1960  Eakin .................................. 343/17.7
3,219,744  11/1965  Mazziotti ............................. 35/10.4

*Primary Examiner*—Malcolm F. Hubler

EXEMPLARY CLAIM

1. Apparatus for producing a test signal comprising:
   generator means for producing a signal of varying frequency;
   gating means connected to said generator means for alternately delivering and blocking said varying frequency signal;
   noise generating means for generating random noise, and
   adding means connected to said gating and to said noise generating means for burying said delivered varying frequency signal in said random noise to form said test signal.

10 Claims, 12 Drawing Figures

INVENTORS
JAMES E. McGEOGH
GAROLD K. JENSEN

BY *James D Murray* AGENT

*R Sciascia* ATTORNEY

INVENTORS
JAMES E. McGEOGH
GAROLD K. JENSEN

BY James G. Murray AGENT

ATTORNEY

INVENTORS
JAMES E. McGEOGH
GAROLD K. JENSEN

BY James B. Murray AGENT
ATTORNEY

FIG. 11

INVENTORS
JAMES E. McGEOGH
GAROLD K. JENSEN

BY *James D. Murray* AGENT
*(signature)* ATTORNEY

SIMULATOR OF RADAR RETURN SIGNALS FROM AN ACCELERATING TARGET

The invention described herein may be manufactured and used by or for the Government of the United States of America for governmental purposes without the payment of any royalties thereon or therefor.

In recent years improvements in radar systems, particularly as a result of the use of signal storage and correlation techniques, have provided vast improvements in object detection capabilities. The storage and correlation techniques provide satisfactory operation with signals literally buried in the noise, as, for example, when noise exceeds the signals by many db. As originally developed these improvements were not applicable to objects capable of immense changes of velocity and acceleration, such as occur when a missile goes from a launching pad to the ionosphere. This problem was solved with the successful completion of the acceleration gate concept of Garold K. Jensen as disclosed in application Ser. No. 53,312 filed Aug. 31, 1960, later improved as disclosed in application Ser. No. 285,555 filed May 31, 1963.

The resulting radar systems are extremely complex and include interacting circuitry which must be adjusted to a very precise degree. The provision of signals with which to make such adjustments is a problem. To obtain actual radar reflections would require the launching of a friendly intercontinental ballistic missile having launch azimuths and acceleration characteristics related to those of the missiles to be detected. This, of course, is impractical financially and for other considerations. The provision of actual radar signals for test and adjustment has, in general, previously been limited to events connected with the test of a type of missile rather than the firing of a very expensive missile solely to provide a test signal for the radar system.

The use of actual radar signals to adjust and test the acceleration gate radar systems has not been satisfactory, either for initial system adjustment or when such radar systems are used for early warning or for training operating personnel.

Therefore, there is a definite need for apparatus which will simulate actual return signals from objects having the acceleration characteristics of missiles to be detected and thereby permit checking the adjustment and response of critical signal processing circuitry.

Just how extensive such a simulator must be depends upon many factors, not the least of which is expense. In general, it has been concluded that a comparatively small quantity of different acceleration characteristics, analyzed in sequence, can drive the acceleration gate radar system through a sufficient range of operation to provide a satisfactory test of the entire system operation and capabilities and to educate operators.

Another consideration is the frequency characteristics of the simulating signal. The signal could be introduced into the radar at any of a number of different stages, viz., rf., if, or video. However, the really critical circuitry in the acceleration gate radar system is that subsequent to the video detector. The prior circuitry can be tested readily with commercially available signal generators and the placement of the video signal on an additional carrier provides an unnecessary complexity to the simulator and another spot where extreme care must be exercised to avoid the introduction of extraneous signals.

Thus the decision was made that the simulated signal should be introduced into the acceleration gate radar system just subsequent to the video detector and that the simulated signal would be synchronized to the pulse repetition frequency of the radar and "buried" in noise to duplicate, as closely as possible, the video signals resulting from several actual signal return objects of different range, range rate and acceleration characteristics.

Accordingly it is an object of the present invention to provide signal simulation for an acceleration gate radar system.

Another object of the present invention is to provide a signal simulator which will produce video signals suitable for driving an acceleration gate radar system in a manner of operation likely to be encountered with actual return signals from ballistic missiles and the like.

Another object of the present invention is to provide a device for producing pulse type signals, synchronizable to a pulse type radar system, which vary in frequency in the manner of the doppler frequency variation of radar return signals due to relative motion between the radar system and objects capable of high acceleration as well as constant velocity.

Other objects and advantages of the invention will hereinafter become more fully apparent from the following description and the annexed drawings which illustrate a preferred embodiment, and wherein:

The particular embodiment shown by the preceding figures is capable of supplying a simulated radar video signal which is preset for range, range-rate, and acceleration for each position of a sequencer. Twelve such positions are provided by the sequencer; these positions may be preset in such a manner to simulate a specific known target trajectory or may be preset in a random manner. Normally, the stepping rate is fixed at 20 seconds per position which is the normal integration time of the system, but this may be mechanically changed by a change in the sequencing rate. It is necessary, as regards the simulator, that it be capable of producing properly phased rf bursts (pulses), typically of 240 microsecond duration, synchronized to the radar system operation.

To simulate a number of different possible conditions, the apparatus contains a plurality of control sections which may be adjusted to sequentially and repetitively produce selected frequency variation patterns. The apparatus is also provided with means for inserting a 240 microsecond pulse after a selectable time delay following each transmitter pulse to simulate range, of adjusting doppler frequency to simulate range rate and for shifting the frequency at a selected rate to simulate acceleration.

Figure 1:
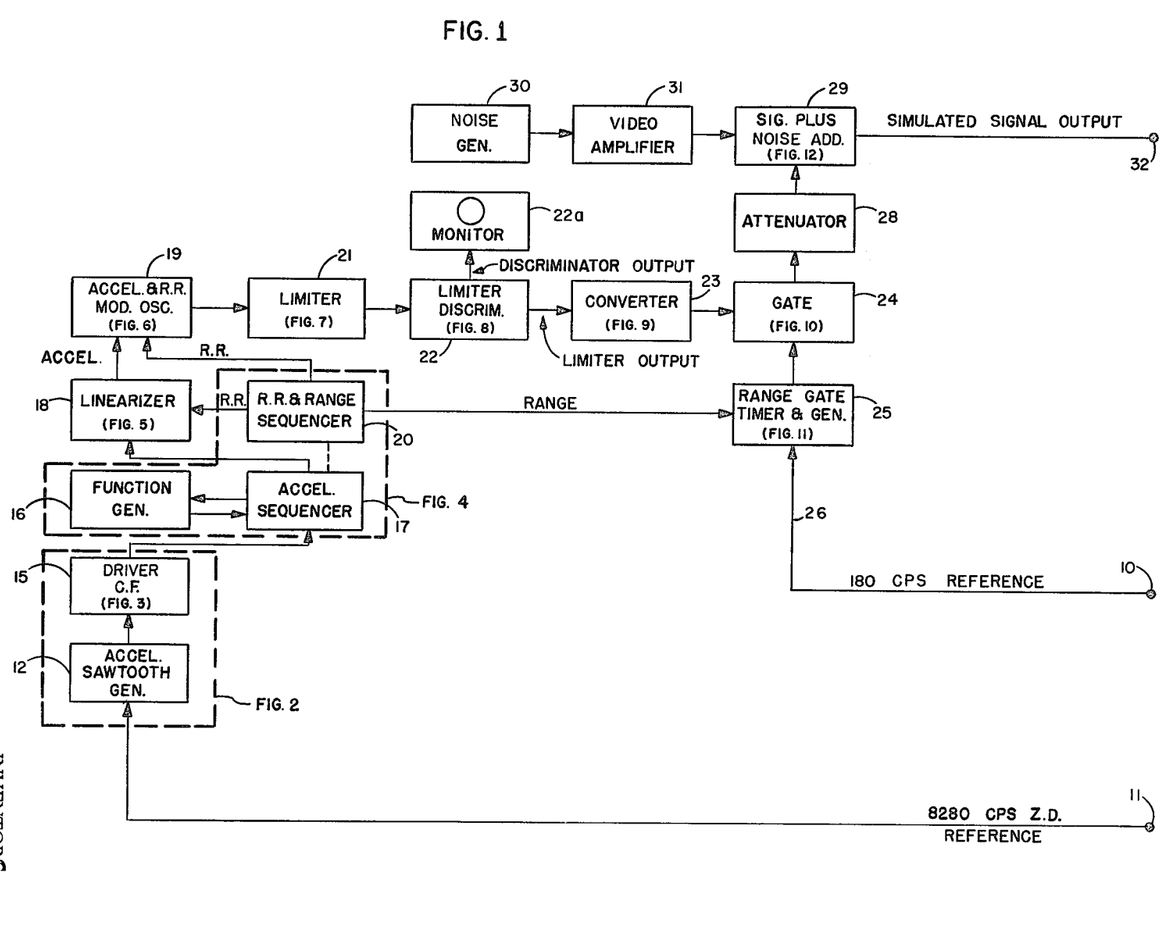
FIG. 1 shows in block diagram form a typical embodiment of the features of the invention indicating the interconnections of the various components shown in schematic detail by other figures. Additionally, connections to a typical acceleration gate radar system are shown to provide for synchronizing the operation of the simulator to that of the radar system.

With reference now to FIG. 1 of the drawing, the apparatus shown therein is a block diagram of a typical embodiment of the features of the present invention. As has been mentioned, this apparatus is intended to operate with or as a part of a radar system of the type described in the copending applications and which contains various reference frequency signals preserving the desired timing relationships of the individual signals. The basic pulse repetition frequency (p.r.f.) of the radar system is 180 cycles per second. The radar system divides the available range into 23 increments. This results in the existence of a zero delay reference frequency of 8280 cycles per second. Thus the apparatus of FIG. 1 is intended to receive two input signals at terminals 10 and 11 to synchronize the operation thereof to the radar system. The typical 8280 cycles per second signal at terminal 11 is applied to the acceleration sawtooth generator 12, which is shown in typical detail in FIG. 2.

The acceleration sawtooth generator 12 provides a highly linear repetitive sawtooth output signal, at a frequency of 4140 cycles per second to the driver cathode follower amplifier 15 which provides isolation and impedance optimization in the drive to the function generator 16. The function generator 16 shown in greater detail in FIG. 4 operates to distort the highly linear sawtooth wave produced by the sawtooth generator 12 to simulate the variational characteristics in the frequency of the return signals obtained from typical signal return objects. Normally such objects possess various motion characteristics depending upon the number of stages that might be involved in the propulsion of a missile or other such factors. Thus, when it is desired to simulate the characteristics of missiles or objects having different speed or acceleration characteristics, it is necessary to provide a number of function generators 16 which can be selected at will or in a rapidly recurring sequence so as to cover a wide range of variational characteristics in a short period of time. As an example, it is quite practical to employ a quantity of 12 different preset functions which are selected by the acceleration sequencer 17 in a repetitive sequence.

The output of the function generator 16, as controlled by the sequencer 17, is applied via a linearizer 18 to the modulated oscillator 19. The modulated oscillator is intended to produce a signal which varies in frequency in the same manner as the doppler frequency of the radar return signal received from a moving target. In the radar system described in the copending application, a frequency cancelling technique is used and an output signal is derived which is related to the frequency difference between the emitted radar energy and the received echo energy. In other words, the output frequency is dependent upon the relative motion of the radar system and the reflective object, the output being higher in frequency for higher rates of relative motion and lower in frequency or approaching zero for lower rates of motion or zero relative motion. Since the present signal simulator provides signals which are typical of signals for various acceleration patterns, the output of the oscillator 19 must be such as to be related to the desired variations.

The modulated oscillator 19 employs two basic frequency variation schemes, one at a rather high rate and the other at a lower rate. The basic high rate variation is as a result of the signal supplied from the linearizer 18 whereas the low rate modulation is applied from the range rate and range sequencer 20 controlled by acceleration sequencer 17. The two modulations of the oscillator 19 occur simultaneously. It is, of course, necessary that the modulation of the oscillator 19 by the signal from linearizer 18 include substantially the same frequency range regardless of variation produced by the signal from the sequencer 20. This requires rather unusual modulation apparatus which is shown in detail in FIG. 6.

For the purposes of the present discussion of FIG. 1, however, it will suffice to describe the modulation responsive to the signal from linearizer 18 as being produced with the involvement of a rather unusual form of frequency variational device, namely, a back-biased semiconductor diode which is selected and operated so as to exhibit variable capacitance properties depending upon the magnitude of a biasing voltage applied to it. It is characteristic of such a frequency variational component that its effect is not linear. In other words a linearly varying applied voltage does not produce a linear frequency variation of the oscillator with which the variable capacitor is associated. It is necessary for linearizer 18 to distort the output of the function generator 16 in such a manner that the frequency of the oscillator 19 changes in the same manner as the output of the function generator 16. It is thus seen that a double distortion of the extremely linear output from driver 15 is provided, first in the function generator 16 and secondly in the linearizer 18, to achieve a signal from oscillator 19 which is related to actual signals in a radar system for a target having selected acceleration and velocity characteristics. Stated another way, the distortion produced by the linearizer 18 may be characterized as being such as to produce a linearly varying oscillator frequency for a linearly varying drive voltage to the linearizer 18. Since the motion of an object to be detected by the radar system produces a radar return signal which may vary in range and range rate, as well as acceleration; it is the purpose of the range rate and range sequencer 20 to introduce voltages representing range rate variations into oscillator 19 and range variations into the range gate timer and generator 25.

For the simulator of the present invention to be useful for determining the response characteristics of an associated radar system over a wide range of operational conditions, it is required that precise control be exercised over the amplitude of the signal produced by the oscillator 19. It is also essential that a simulation by the addition of noise be available to produce an overall video signal of the type desired. In the case of the type of radar system of the copending applications, the signals are buried many decibels below the noise level.

Signal limiting is obtained by first and second limiters 21 and 22 which eliminate all amplitude variations in the output of the modulated oscillator 19. The amplitude limited, frequency variational signals obtained from the final limiter 22 are applied to a frequency converter 23, the purpose of which is to translate the frequency of these signals to the frequency range corresponding to that involved at the point of input in the typical radar systems of the copending applications.

Converter output signals are gated by a gate device 24 to simulate the reflected signals which exist in a radar receiver system and are related in time to the transmitter pulses by the range of the target. Simulation of varying range is accomplished in gate 24 by the range gate timer and generator 25 which is in turn controlled by the rage rate and range sequencer 20 and the 180 cycle per second synchronizing signal obtained in line 26 from terminal 10. Gated signals from gate 24 are applied through attenuator 28, by means of which a further precise control over ammplitude is possible, to an adder 29 which performs the addition of the gated signals to the noise produced by a noise generator 30 and amplified by video amplifier 31. The added signals then constitute the output from the signal simulator which, when delivered to a radar system such as that of the copending applications, produces the desired result of simulating the reflected signal from a missile or object having certain acceleration and range rate characteristics. This output is obtained at a terminal 32 and is delivered to the radar system video section.

Figure 2:
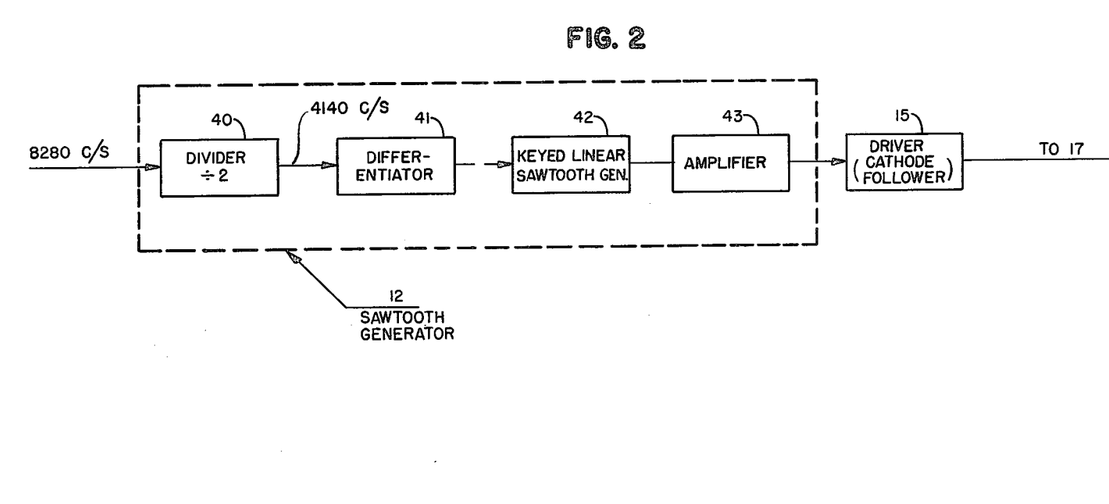
FIG. 2 indicates, also in block form, the principal components of a suitable acceleration sawtooth generator 12 for FIG. 1.

With reference now to FIG. 2 of the drawings, the apparatus of the acceleration sawtooth generator 12 of FIG. 1 is indicated in greater detail. Again, however, the block form of presentation is employed because the individual components are well known. The apparatus of FIG. 2 contains within the acceleration sawtooth generator 12 a frequency divider 40 which divides the 8280 cycles per second signal by a factor of 2. The output of divider 40 is connected to a differentiator 41, the purpose of which is to provide short duration spike pulses to control the operation of a keyed linear sawtooth generator 42. The keyed linear sawtooth generator 42 is connected to amplifier 43 which provides isolation and suitable power level and amplitude to the linear sawtooth signal. The amplified output from 43 is applied to the driver cathode follower 15.

Figure 3:
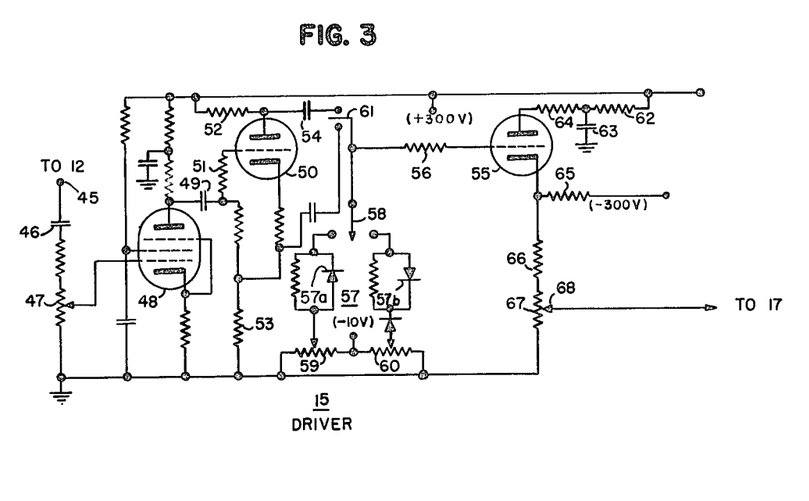
FIG. 3 shows schematic details of a cathode follower driver possessing accurate control of d-c levels such as is desirable for driver 15 of FIG. 1.

Details of the driver cathode follower 15 are shown in schematic form in FIG. 3. The input from the amplifier 43 of the acceleration sawtooth generator 12 is applied to terminal 45 and delivered via a d.c. blocking condenser 46 to a potentiometer 47, a selectable portion of this input being applied to the grid of an electron tube 48. Tube 48 is seen to be in a high gain pentode amplifier circuit having high input impedance with filtered or decoupled anode and screen supplies. The anode of tube 48 is coupled via capacitance 49 to the grid of tube 50 through a parasitic suppressing resistor 51. Tube 50, which has an anode load resistor 52 together with a cathode load resistor 53, provides inversion of the polarity of the signal without introducing additional gain or distortion.

The anode of tube 50 is coupled via capacitance 54 to the grid of tube 55 by a limiting or parasitic suppressing resistor 56 connected to a d.c. clamping circuit, indicated in general by the reference character 57, in which two different clamping levels and polarities may be selected by means of switch 58. As shown, this clamping circuit has several unilateral impedance devices 57a and 57b connected to potentiometers 59 and 60 by means of which a selectable d.c. clamping voltage is obtained. With this arrangement it is possible to clamp either at the positive or negative extremity of the sawtooth signal. Additional circuit flexibility is provided by switch 61 which permits the selection of either the inverted or the non-inverted signal from amplifier tube 50. This can be of advantage in certain instances depending upon the form of doppler frequency variation desired. Tube 55 is in a cathode follower circuit having anode supply filtration in the form of resistance 62 and capacitance 63. A parasitic suppressing resistor 64 is also in the anode circuit. The cathode circuit employs a resistance 65 which is connected to a negative potential together with series resistances 66 and 67 which are connected to ground. Resistance 67 is a potentiometer by means of which the size of the signal developed at the cathode of tube 55 can be varied for delivery to output 68.

Figure 4:
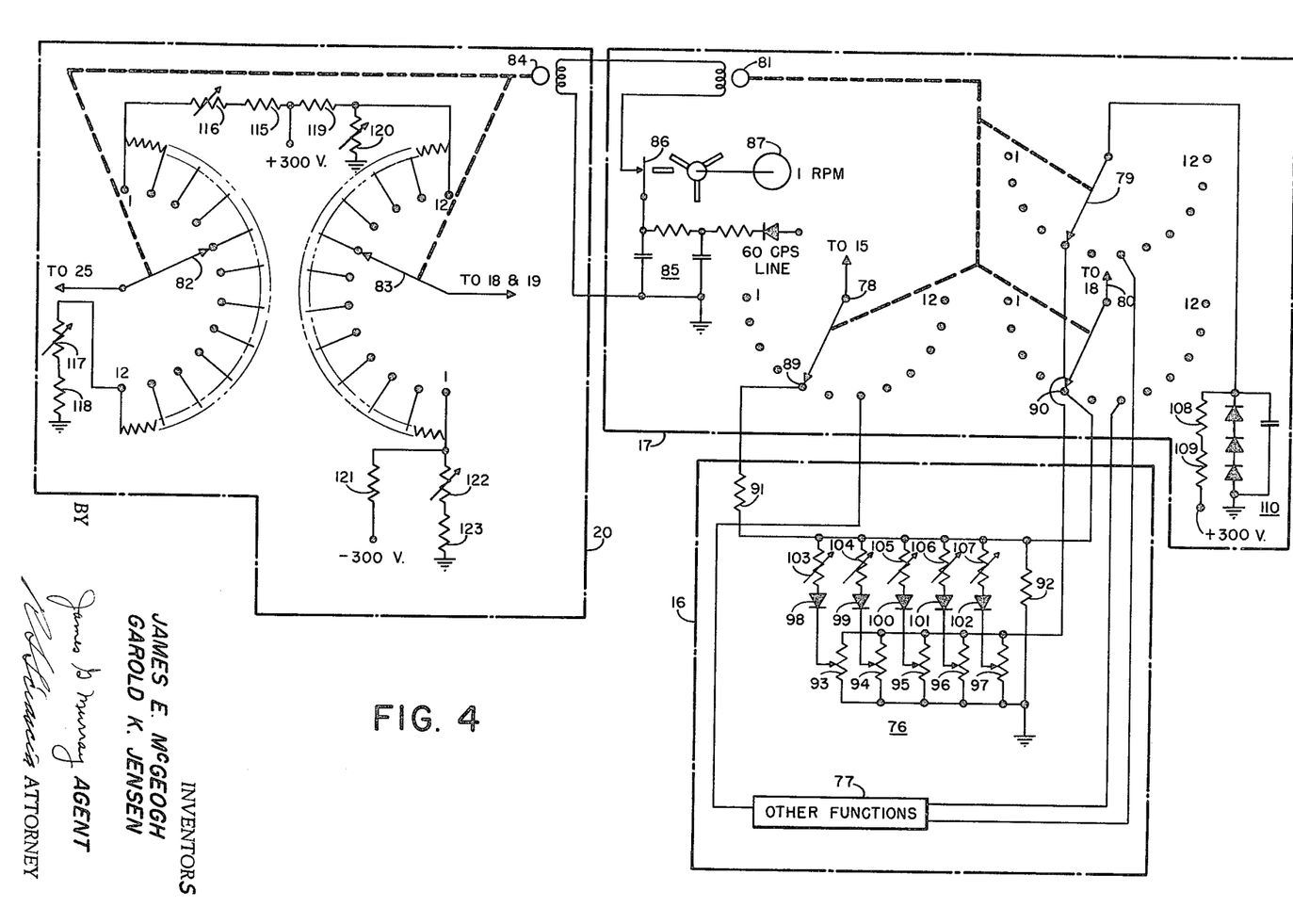
FIG. 4 shows schematic details and interconnections of function generator 16, acceleration sequencer 17 and range and range rate sequencer 20 of FIG. 1.

With reference now to FIG. 4, the apparatus illustrated, principally in schematic form, contains details of the function generator 16, the acceleration sequencer 17 and the range rate and range sequencer 20 indicated in FIG. 1. In general, the function generator 16 is made up of the typified network identified by reference character 76 together with 11 additional similar networks, of which only one such network 77 is shown specifically. The various networks are designed to have voltage response functions related to the missile flight patterns to be simulated. Selection of the functions in a controlled manner is performed by the acceleration sequencer 17 of which the principal components are the 12 position switches 78, 79 and 80. These switches are mechanically coupled with an actuation device indicated in general by an armature 81.

The principal components of the range rate and range sequencer 20 are associated with the switches 82 and 83 driven by the armature device 84. In general the switches and armature devices 78, 79, 80, 81, 82, 83 and 84 operate together from a single power supply, indicated generally by the reference character 85, under the control of a sequencing switch 86 operated by a cam arrangement controlled by synchronous motor 87. The acceleration sequencer switches 78, 79 and 80 select the various functions as desired and are illustrated as a conventional mechanical switching arrangement. The range rate and range sequencer 20 provides merely for the generation of a series of, in this instance 12, distinct d.c. voltage levels applied to the linearizer 18 and modulated oscillator 19 by switch 83 and to the range gate timer and generator 25 by switch 82.

The function generator 16 is a collection of, in this instance 12, individual function components, one being shown in schematic detail and indicated by the reference character 76. Basically the apparatus 76 is a resistance voltage divider with an input at point 89 and an output at point 90. This output is derived as a selected fraction of the input by virtue of the connection of point 90 to the junction between resistance 91 and 92 which are connected between point 89 and ground. A function generator with only the two resistance components 91 and 92 would provide a constant fraction of the input for the output signal. In many instances such a constant relationship of input to output is not desired.

In general, missiles have acceleration or velocity flight patterns which depend upon the propulsion characteristics of such a vehicle. Burn-out and ignition of the various successive stages of the multistage vehicle, for example, produce quite drastic changes in acceleration of the vehicle. To simulate these changes, additional signal components are provided within the function generators by causing the ratio between the output and input voltages to vary at different portions of the input waveform. In network 76, these signal components are obtained from potentiometers 93 through 97, diodes 98 through 102, and variable resistors 103 through 107. With this arrangement, it is possible to vary the voltage of the input signal at which each of the diodes 98 through 102 becomes conductive to place additional resistance in parallel with the resistance 92 and to alter the voltage division ratio of the overall voltage divider. In this way it is possible to control the input versus output relationship to provide a waveform that has a desired distortion relative to the extremely linear input applied at terminal 89.

With the 12 function generators represented by reference characters 76 and 77 it is possible to obtain a total of 12 different input-output voltage reltionships so that energy reflective objects having 12 different characteristics can be simulated.

It has previously been mentioned that the selector switches 78, 79 and 80, provide selection of the various function generators 76 and 77, etc. To this end the selector switch 78 is connected to the input 89 and the selector switch 80 to the output terminal 90 while the selector switch 79 is connected to a suitable source of positive potential. When connected to the network 76, this potential provides the voltage across the potentiometers 93 through 97 which control the level of conduction of the diodes 98 through 102. As shown in FIG. 4, the movable contact of the switch 79 is connected to a positive supply voltage through resistances 108 and 109 and a Zener diode regulation filtering network 110 which limits the magnitude of the voltages existing in the circuit during the switching operations.

Switches 82 and 83, which constitute the primary components of the range rate and range sequencer 20 of FIG. 1, are merely stepwise d.c. voltage producing devices. Switch 82 is connected between a +300 volt source and ground through resistance 115, 116, 117, 118. Resistances 116 and 117 are adjustable for precise control of the various extremes of d.c. voltage level. The contacts 1 through 12 of switch 82 are connected together through resistors to provide 12 successive d.c. levels to the range gate timer and generator 25 as successive range gate signals.

Likewise the switch 83, which provides the range rate d.c. level signals for the linearizer 18 and modulated oscillator 19, is connected between a +300 volt supply and a −300 volt supply by a combination of resistance 119 through 123. Resistances 120 and 122 are adjustable to control the d.c. potentials at the extreme positions of switch 83 which delivers 12 different d.c. voltage levels to the linearizer 18 and to the modulated oscillator 19 as a range rate variational signal.

The switches 78, 79, 80, 82 and 83 have previously been indicated as being controlled by the armatures 81 and 84 of step or relay coils. These coils are typically placed in series across a d.c. voltage source, indicated in general as a rectifier and filter network 85, with the intermittent actuation of the relays being provided by the switch 86 controlled by a 3 lobe cam driven at 1 rpm by reduction geared motor 87. The cam may be changed for other rates of switching.

Figure 5:
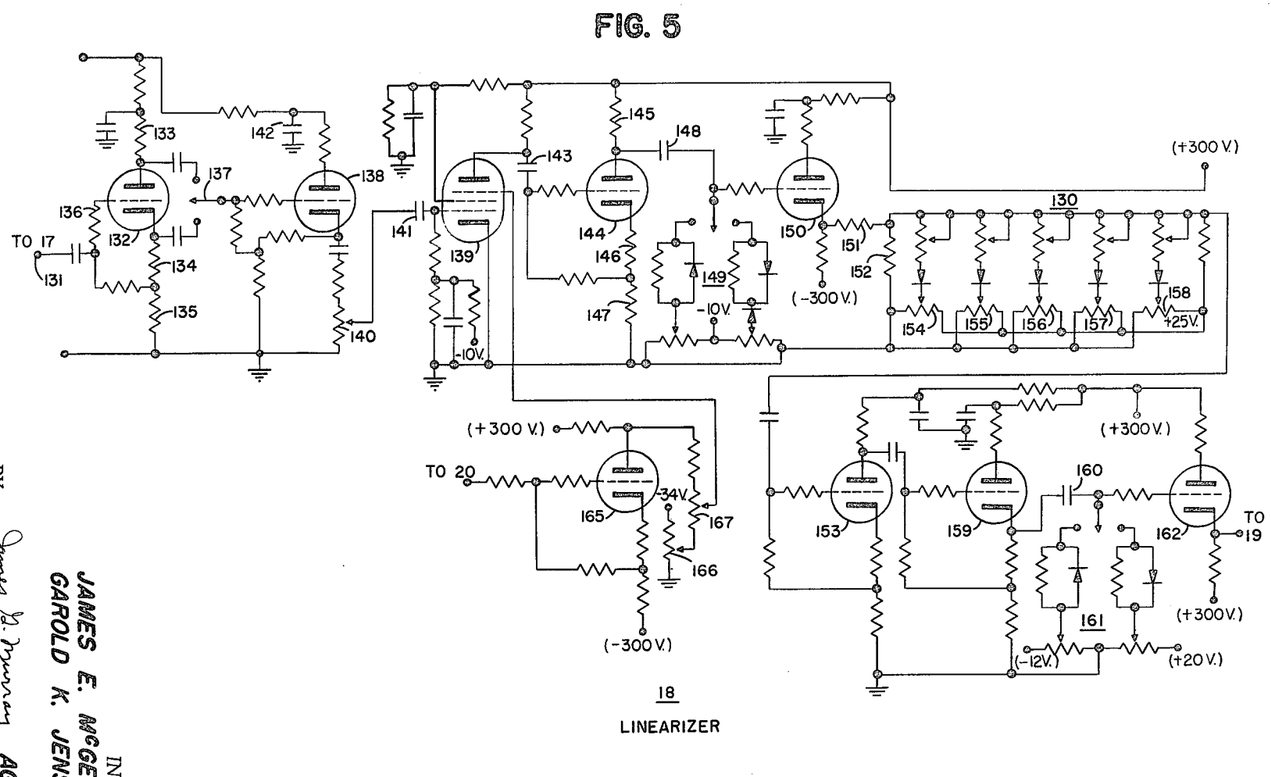
FIG. 5 shows schematic details of the linearizer 18 of FIG. 1.

Referring now to FIG. 5, apparatus contained within the linearizer 18 of FIG. 1 is shown in schematic detail. As has been previously indicated, the linearizer is actually a distorter which distorts the signal from the function generator 16 to compensate for the nonlinear characteristics of the frequency modulating device within the modulated oscillator 19. To this end the linearizer employs a variable voltage divider arrangement, indicated in general by the reference character 130.

The voltage representing different patterns of acceleration is delivered by switch 80 to the input terminal 131 of the apparatus of FIG. 5. This input signal is applied to a split-load form of inverter device, of which tube 132 is the principal element. The anode load resistor 133 and the cathode loading resistors 134 and 135 are of such size as to result in the production at the anode and cathode of tube 132 of equal amplitude but opposite polarity signals. Grid resistor 136 is provided to eliminate parasitic oscillations. Selection of either polarity output signal from the stage of tube 132 is accomplished by a switch 137 connected to the grid of tube 138. This tube is in a cathode follower circuit connected to the grid of the succeeding tube 139 through a potentiometer 140 and a suitable coupling circuit, indicated in general by reference character 141. Tube 138, as mentioned, is in a cathode follower circuit which includes parasitic suppressing resistors in the anode and grid circuits together with a plate supply decoupling or filtration circuit, the latter being indicated in general by reference character 142. Tube 139 is in an anode loaded circuit of conventional fixed bias configuration, the output being taken from the anode through capacitance 143 to drive the succeeding amplifier stage of tube 144. This tube is in a stage of amplification inserted partly for inversion, with the anode resistance 145 and cathode resistances 146, 147 being of such a size as to provide inversion with a minimum introduction of distortion. The anode of tube 144 is coupled by a capacitance 148, together with d.c. restoration components indicated in general by 149, to the grid of tube 150 which is employed as a low-impedance driver for the linearizer network 130. This linearizer network is a voltage divider with basic resistance elements 151 and 152. The output is taken from the junction of resistances 151 and 152 and supplied through a suitable coupling network to the succeeding tube 153. Alteration of the basic division ratio of resistances 151 and 152 is provided by the shunt biasing elements which place additional resistance across resistance 152 at selected voltage levels controlled by the potentiometers 154 through 158.

The output of the linearizer network is applied to tube 153 which in turn is connected to tube 159. This tube is in a circuit similar to that previously described for tube 144. In this instance output is taken at the cathode of tube 159, however, it is obvious that the output could also be taken from the anode. The cathode of tube 159 is coupled by means of capacitance 160 and a d.c. restoration network 161 to the grid of output cathode follower tube 162. The cathode of tube 162 in turn is connected to the modulated oscillator 19 of FIG. 1.

In general it is difficult to use two modulating signals to drive an oscillator over an extremely wide frequency range without some interaction. In other words, a change of a given magnitude in one signal produces a different frequency shift in the oscillator frequency at different values of the other signal. To avoid this, the basic signal involved in the linearizer of FIG. 5 is supplemented by a range rate variational signal obtained from the range rate and range sequencer 20 and applied to the grid to tube 165. This tube is connected to the suppressor grid of tube 139 via biasing and amplitude adjustment potentiometers 166 and 167 to provide compensation for oscillator interaction in the signal delivered from the linearizer 18 to the modulated oscillator 19.

Figure 6:
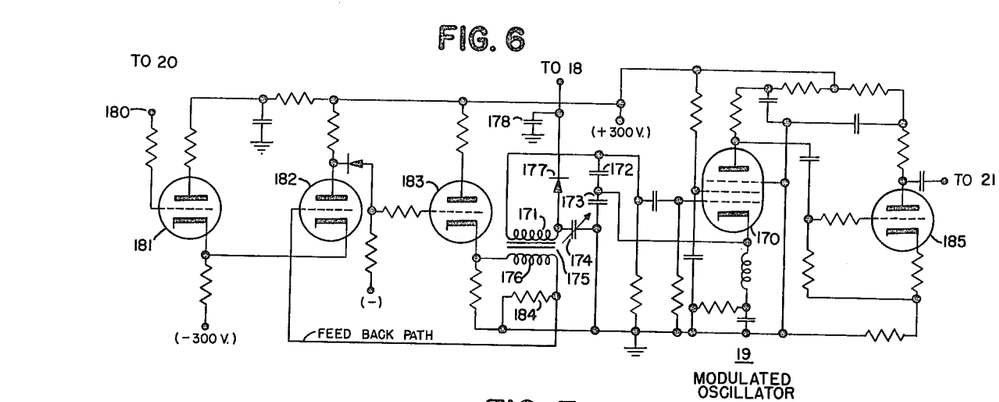
FIG. 6 shows schematic details of the acceleration and range rate modulated oscillator 19 of FIG. 1.

FIG. 6 shows, in schematic form, details of the acceleration and range rate modulated oscillator 19. The basic oscillator consists of tube 170 and a resonant circuit which includes inductance 171, voltage variable capacitor diode 177 and the trimmer capacitance 174. Series capacitances 172 and 173 form a circuit which determines the feedback ratio of the basic oscillator. This oscillator is swept in frequency in two ways. The first is by varying the current through the winding 176, and the magnetization in the core 175, whereby the inductance of the component 171 is changed to control the oscillator frequency. The second form of frequency variation of the oscillator 170 is obtained by means of the diode 177 which is connected to the resonant circuit at the junction of components 171 and 174. The other side of the diode is connected to ground through a bypass capacitance 178 and to the output of linearizer 18. The diode 177 can be any one of the well known diodes which, by a nonlinear relation, change capacitance in response to a change of applied voltage. Brief mention of the nonlinear diode characteristics has previously been made in conection with the explanation of the need for the linearizer 18.

The input from the linearizer 18 to the variable capacitance element 177 includes the high rate acceleration variable originating in the function generator 16 whereas the slowly changing range rate input from the range rate and range sequencer 20 is the signal applied to the primary winding 176. The circuit connections of the former have been described in sufficient detail. However, additional components are required to complete the connection of the component 176 to the range rate and range sequencer 20, which was shown in greater detail in schematic form in FIG. 4 and to which coincidental attention is directed. In the apparatus of FIG. 4 a stepwise varying d.c. potential was obtained by the switch 83 and indicated as being supplied to the acceleration and range rate modulated oscillator 19. Thus the movable contact of the switch 83 is connected to input terminal 180 and through a suitable resistor to the grid of tube 181 which is employed as a cathode driver for the subsequent tube 182. Tube 182 has a second input applied to its control grid, this second input being a feedback signal proportional to the current flowing through the control winding 176 and the voltage drop acrosss resistance 184 which is effectively in series with winding 176 as far as the d.c. current therethrough is concerned. The anode of tube 182 is connected by a coupling circuit of conventional configuration to the grid of tube 183. This tube is primarily a current amplifier used for driving current through the winding 176. Tube 183 is a cathode follower form of circuit which is suitable as a low impedance driver. The feedback provides extreme linearity in the operation of this amplifier so that, for practical purposes, under the control of sequencer 20, a stepwise current variation occurs in winding 176 which in turn has a stepwise variational effect upon the operational frequency of the oscillator of tube 170.

The output of tube 170 is coupled, by conventional circuitry, to tube 185, the output of which is, in turn, connected to limiter 21. Because of the extremely wide frequency variation in the output of oscillator 19 and the critical need for uniform amplitude over the frequency range, the design of the limiters 21 and 22 is both extremely important and difficult. As a consequence the limiters 21 and 22 are relatively complex and have been shown in considerable detail in FIGS. 7 and 8. It will be observed that FIG. 8 is in large part identical to the showing of FIG. 7, the duplication being introduced for the purposes of explaining more clearly the interconnections of the various components of the circuit.

Figure 7:
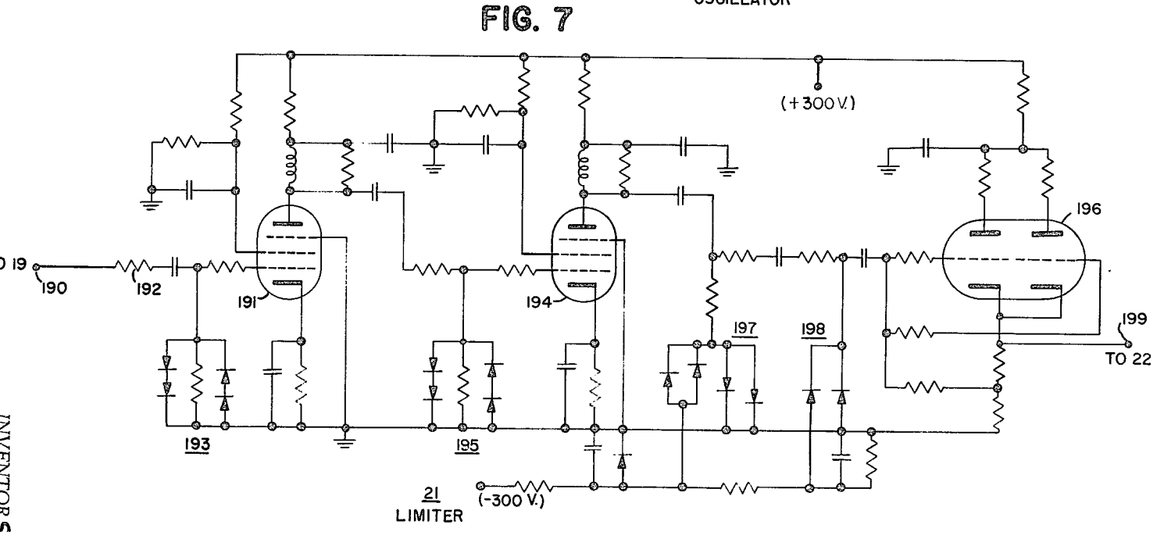
FIG. 7 shows schematic details of limiter 21 of FIG. 1.

With reference to FIG. 7, the limiter 21 includes an input terminal 190 which is connected to the anode of tube 185 of FIG. 6. Terminal 190 is connected to the grid of tube 191 which is in an amplifier low resistance anode circuit of wide bandwidth and low gain. Typical high current amplifier tubes, such as a 12BH7, could be used as tube 191. Terminal 190 is connected to the grid of tube 191 by a first limiter circuit which includes the resistance 192 and the diode clippers indicated by reference character 193. This first clipping stage begins a multistage peak clipping operation of unusual proportions. The output of tube 191 is delivered to a second amplifier 194 which contains in its grid circuit a second peak clipper circuit indicated by reference character 195. In turn the anode output of tube 194 is coupled to a cathode follower output stage of tube 196 through two limiters 197 and 198 which are placed in sequence. The circuitry of FIG. 7 is followed by substantially identical circuitry in the initial stages of limiter 22 so that altogether four stages of wideband amplification are contained in the overall limiter tandem with a total of eight successive peak clippers.

Figure 8:
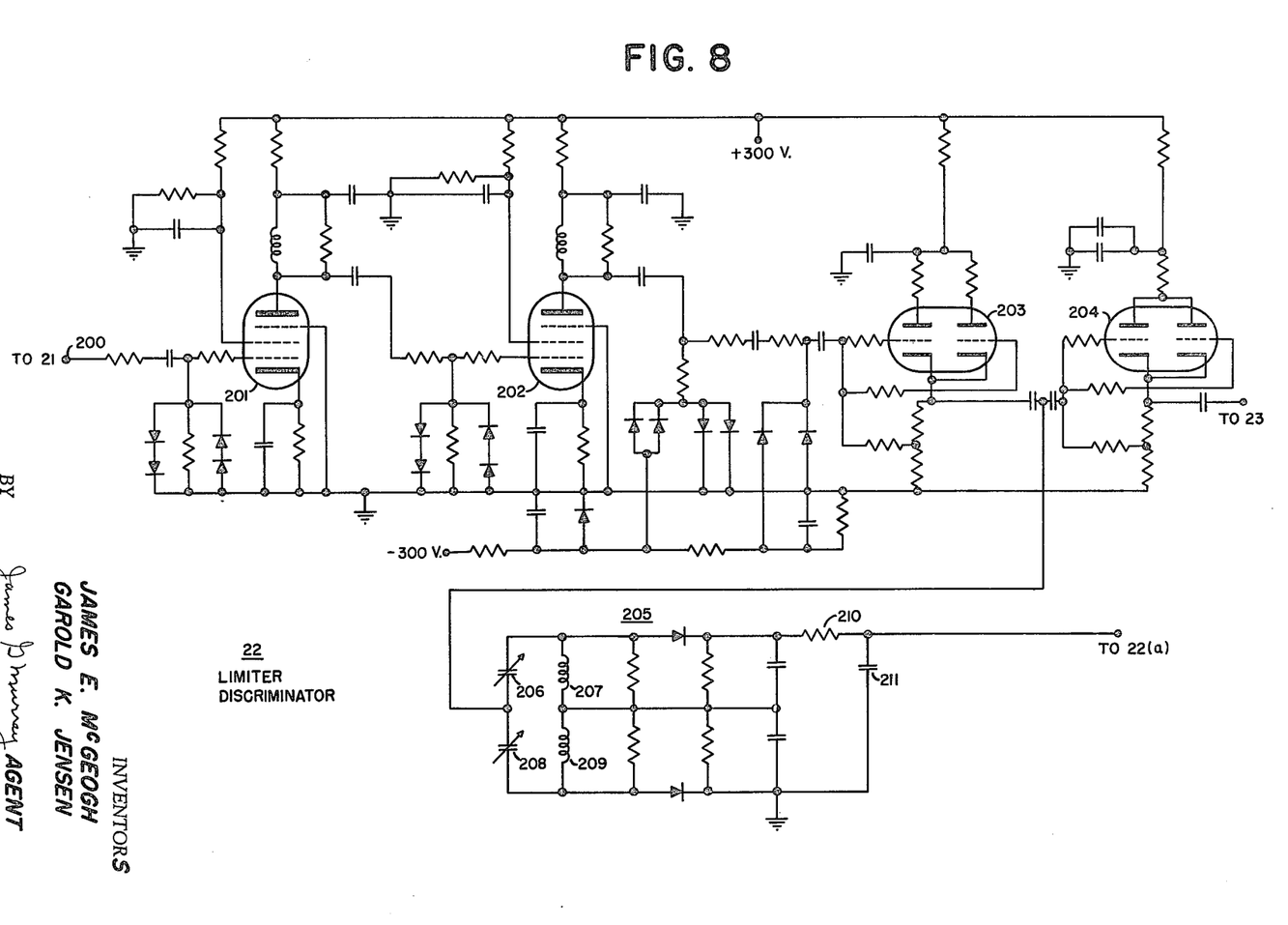
FIG. 8 shows schematic details of limiter discriminator 22 of FIG. 1.

With reference now to FIG. 8, which illustrates the limiter discriminator 22 in schematic detail, the cathode follower output from tube 196, at terminal 199, is applied to the input terminal 200. The circuitry of the first three tubes 201, 202, and 203 in FIG. 8, together with their associated clipper circuits, is a substantial duplication of the limiter 21. In FIG. 8, however, the output from the cathode follower stage 203 is applied to two places, the first being via the second cathode follower stage of tube 204 to the converter 23 and the other being to a discriminator network indicated in general by the reference character 205. The circuit 205 is a discriminator of unusual configuration containing two series resonant circuits in parallel. The first resonant circuit contains capacitance 206 and inductance 207 and the second circuit contains capacitance 208 and inductance 209. One circuit is tuned below the frequency band of interest, the other is tuned above that band. The output voltage developed across each inductance 207, 209 is rectified in a separate peak rectifier circuit wherein the output voltage polarity is selected negative for the lower frequency tuned circuit and positive for the higher frequency tuned circuit and the total output is the sum of both voltages. Each of the series resonant circuits is severely damped by the addition of a resistance in parallel with the inductance, it being observed that the resistances are of different values because of the extremely wide frequency difference between the two circuits. An RC filter can be added to the output as shown in the form of resistance 210 and capacitance 211 to further attenuate the RF signal feedthrough. Output from the discriminator 205 as taken at the junction of resistance 210 and capacitance 211 and is applied to the monitor 22a of FIG. 1, which is typically an oscilloscope having a bandwidth capability suitable for the signals involved.

Figure 9:
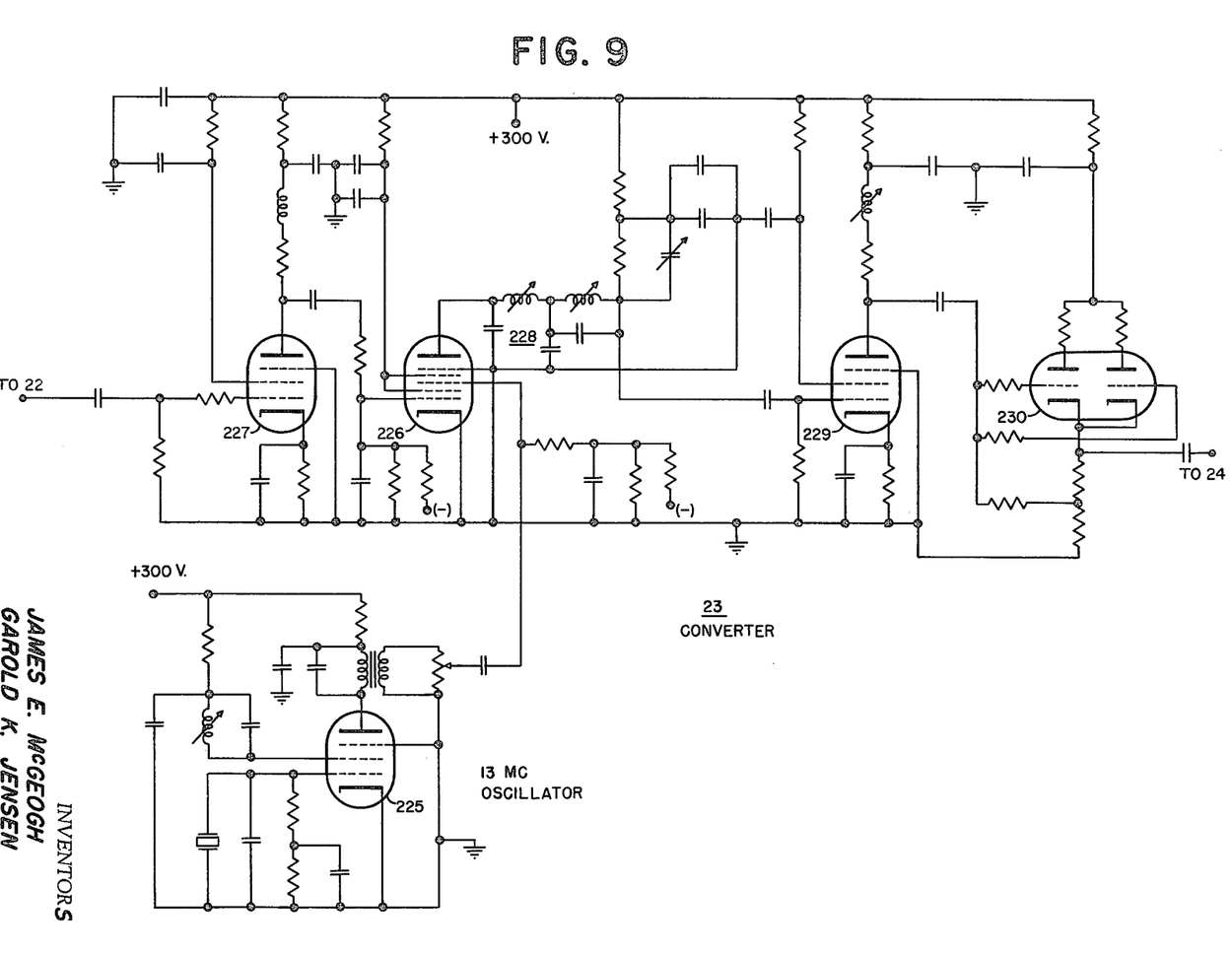
FIG. 9 shows schematic details of converter 23 of FIG. 1.

At this point the simulated signal contains the desird acceleration and range-rate components but is elevated by 13 Mc over the frequency which is compatible with the radar system to be checked. The purpose of the converter 23, shown in FIG. 9, is to mix the output from the limiter 22 with a stable 13 Mc signal and provide the difference signal. Typically these difference signals will extend from 400 KC to a frequency of 7.5 megacycles per second with the lower 400 kilocycles being of lesser importance because of the correspondence thereof to objects possessing extremely low rates of motion. Further actual radar signals in the lower 400 kilocycle range contain a considerable amount of clutter due to transmission variations relating to ionosphere bounce. Thus, the radar system, such as that intended to be used in conjunction with the present invention, will contain a filter which will discard the lower 400 kilocycles per second of the signal. The purpose, then of the converter 23 is to alter the limiter output which varies from a frequency of 13.4 to 20.5 megacycles to the radar system frequency of 400 kilocycles to 7.5 megacycles.

The converter contains a local oscillator which includes tube 225 and is crystal controlled to produce an output signal at a frequency of 13 megacycles per second. This signal is mixed in mixer tube 226 with the limiter output signal as obtained through a buffer video amplifier 227. It is appropriate to observe that video amplifier 227 has a bandwidth such as will permit it to handle the 13.4 to 20.5 megacycles per second signals obtained from the limiter.

The anode circuit of mixer 226 contains a low pass filter 228 tuned to select the low sideband of the mixer output which will, in this instance, cover the range of 400 kilocycles to 7.5 megacycles per second. The filter output is applied by a coupling network to video amplifier 229 which is designed to pass the frequency range of 400 kilocycles to 7.5 megacycles. The output from the video amplifier 229 is applied to a cathode follower impedance conversion device 230 to obtain an output at an impedance suitable for driving gate 24.

Figure 10:
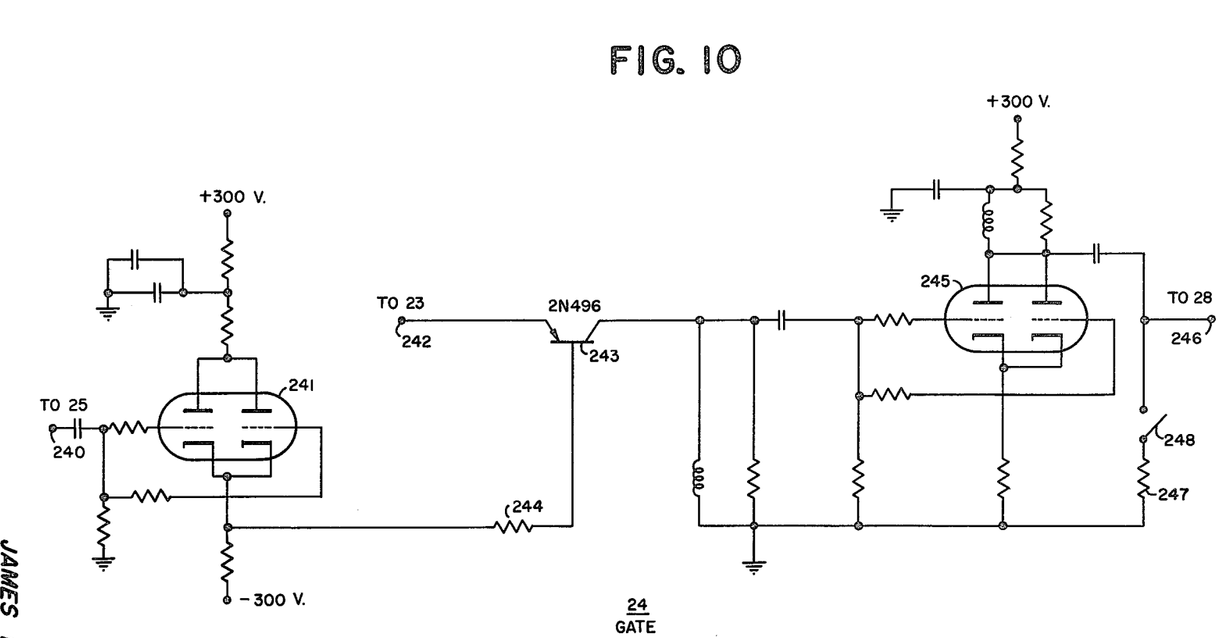
FIG. 10 shows schematic details of gate 24 of FIG. 1.

With reference now to FIG. 10, details of the gate 24 are shown. The purpose of this gate circuit is to provide for periodic delivery of the output of the converter under control of a gating signal. The gating signal is obtained from the range gate timer and generator 25 which will be described in detail in connection with a following discussion of FIG. 11. For the present, it is sufficient to state that the gating signal for the control of the gate 24 is a negative pulse applied to terminal 240 which is connected to the grids of tube 241. The cathodes of tube 241 are connected to a negative supply and the anodes of tube 241 are connected to a positive supply, the result being that, in the absence of the negative gatng pulse, the potential at the cathodes of tube 241 is maintained slightly positive with respect to ground. Upon the application of the negative gating pulses to the grids of tube 241, however, the cathode potential drops to a point considerably negative with respect to ground.

The gate circuit is connected to the converter 23 at input terminal 242 to receive the signal in the frequency range of 400 kilocycles to 7.5 megacycles. Terminal 242 is connected to the emitter of PNP transistor 243, typified as being of a type 2N496. The base of transistor 243 is connected to the cathodes of tube 241 through a limiting resistor 244. Output from the transistor 243 is obtained by connectng the collector through a coupling circuit to the grids of tube 245. This tube is connected as a video type of amplifier in a wide band, low gain circuit that is compatible with the bandwidth involved. The anodes of tube 245 are connected to output terminal 246 which is further connected to the attenuator 28 through a coaxial cable coupling device which provides matched impedance. Since it is frequently desirable to test the circuit of FIG. 10 in the absence of a connection to the attenuator 28, a matching load 247 is provided which can be connected to the output of amplifier 245 by switch 248.

In the operation of the gate 24, the maintenance of a slightly positive potential at the base of transistor 243 holds that transistor blocked against the delivery of signals from input terminal 242 to output terminal 246. During the gating period, however, when the potential at the cathodes of tube 241 is substantially negative, the transistor 243 becomes highly conductive and delivers the signal from the input terminal 242 to the amplifier 245 and to the output terminal 246.

Figure 11:
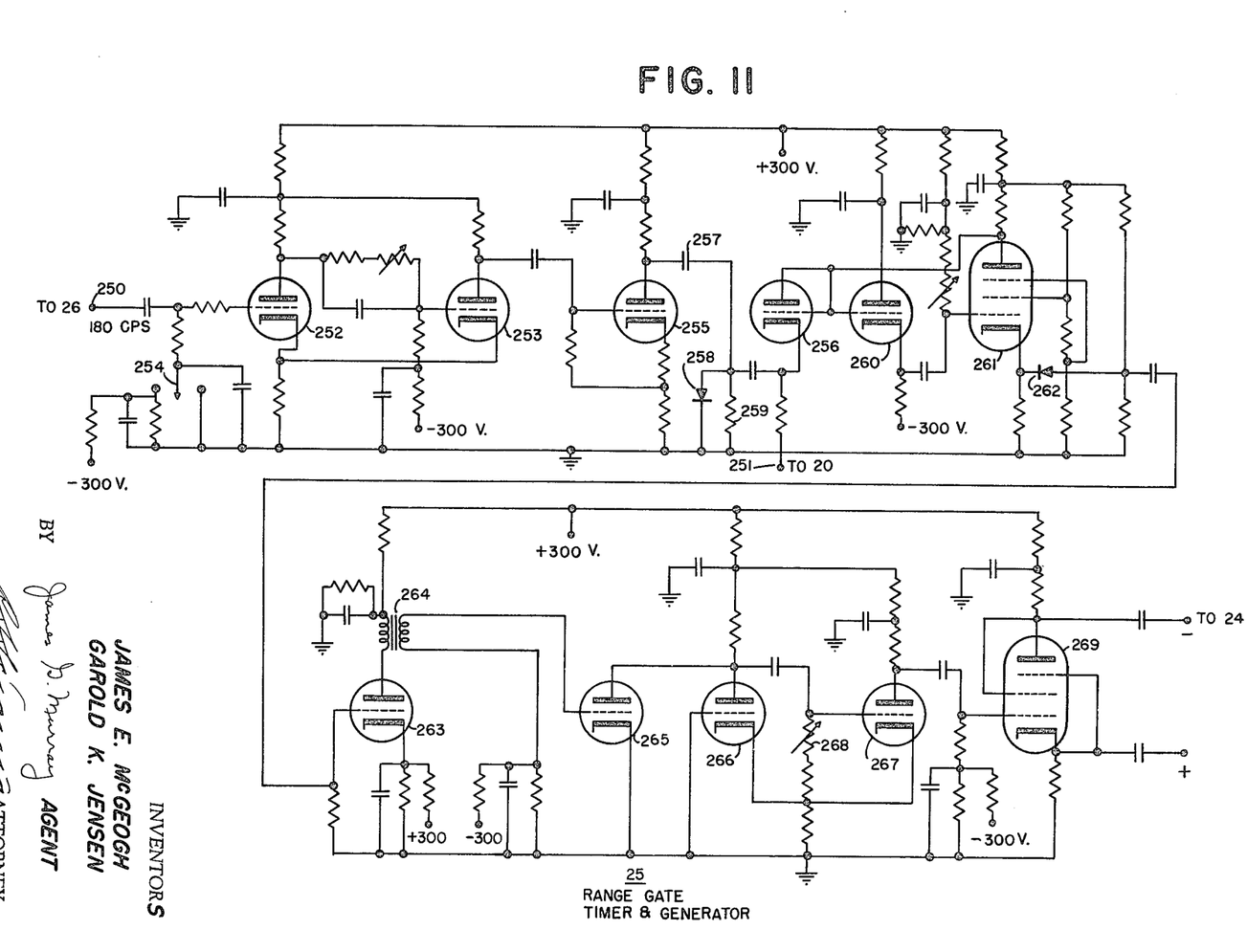
FIG. 11 shows schematic details of range gate timer and generator 25 of FIG. 1.

Attention is now directed to FIG. 11 which shows in schematic detail the range gate timer 25 which provides the gating signal to drive the gate circuit of FIG. 10. To be compatible with the typical radar system, with which the simulator is intended to be used, it is necessary that the gated signal be of 240 microseconds duration and that, to simulate various target ranges, it occur at selectable time periods following each transmitter pulse. In other words, range gate timer is required to be capable of producing a 240 microseconds duration simulated signal at a frequency of 180 cycles per second and at a desired time subsequent to the start of the transmitter pulse. As shown in FIG. 11, synchronism to the 180 cycles per second pulse repetition frequency of the transmitter is provided by applying the 180 cycles per second signal in lead 26 to input terminal 250. A sequencing control signal to select the time at which the range gate timer signal occurs is applied to terminal 251 by the range rate sequencer 20, or more specifically by switch 82 of FIG. 4. As previously described, the resistor circuit associated with switch 82 provides for 12 different d.c. levels. These levels are applied by swtich 82 to terminal 251 and provide 12 d.c. control signals for varying the delay of the 180 cycles per second signal applied to terminal 250.

The synchronizing signal applied to terminal 250 can be in numerous forms. Usually this signal could most conveniently be a pulse synchronized with the start of the transmitter pulse. On occasion, however, it may be advantageous for the synchronizing signal to be sinusoidal in waveform. For this reason the synchronizing input to the apparatus of FIG. 11 includes tubes 252 and 253 connected in a Schmitt type trigger circuit. Switch 254 controls the bias of tube 252 for operation either as a Schmitt trigger circuit with sinusoidal input or as an amplifier for zero delay operation with positive input pulses at terminal 250. In either event positive pulses are obtained at the anode of tube 253 and applied to an inverter stage of tube 255. The negative pulses at the anode of tube 255 are applied to the cathode of tube 256 by a differentiator type coupling circuit which includes small capacitance 257, unilateral impedance device 258 and resistance 259. Thus, negative pulses of extremely short duration will be applied to the cathode of tube 256 in substantial coincidence with the initiation of conduction in tube 252 as a result of the application of the synchronizing signal to terminal 250. Tube 256, tube 260 and tube 261 constitute a phantastron circuit. The circuit produces a pulse of a duration determined by the d.c. potential applied to the cathode of tube 256 from terminal 251. At the conclusion of the pulse produced by the phantastron circuit, a negative signal is applied through unilateral impedance device 262 to the grid of a pulse generator tube 263. The anode of tube 263 is coupled by transformer 264 to the grid of a keying tube 265 having its anode circuit connected to the anode of tube 266, which, together with tube 267, is connected into a one-shot multivibrator circuit. This circuit produces a pulse, precisely controlled as to duration by the variable resistance 268 in the grid circuit of tube 267. Thus, at the anode of tube 267, a positive pulse is produced which is precisely adjusted to the desired duration, typically 240 microseconds, by the adjustment of potentiometer 268, and which is delayed relative to the signal applied to terminal 250 by the operation of the phantastron circuit under the control of the range gate d.c. level signal applied to terminal 251. The negative output pulse produced at the anode of tube 267 is applied to an amplifier circuit which includes tube 269. This circuit provides both positive and negative output pulses so that one or the other, as desired, can be selected for operation of subsequent apparatus. In the embodiment of the invention illustrated, the negative signal from the range gate timer and generator of FIG. 11 is applied to the terminal 240 of the gate 24 illustrated in FIG. 10.

Figure 12:
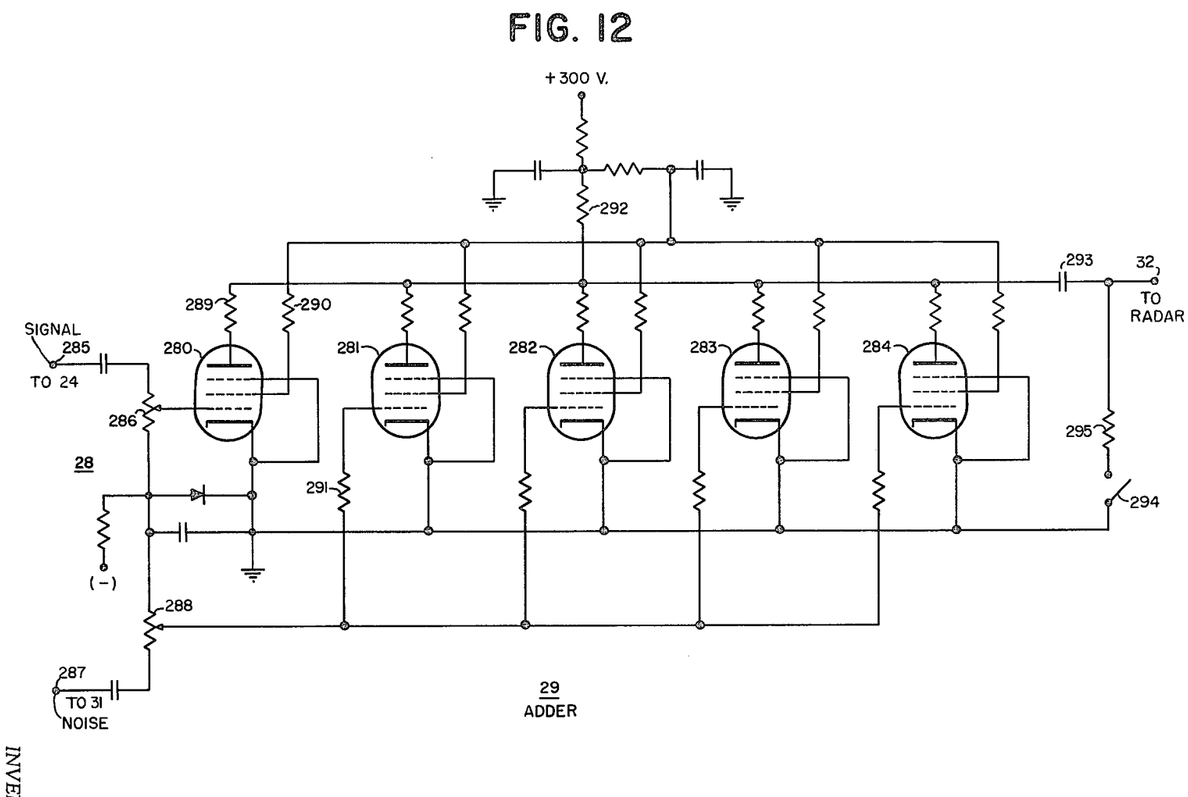
FIG. 12 shows schematic details of signal and noise adder 29 of FIG. 1.

Schematic details of adder 29 are shown in FIG. 12. The adder is, in brief, a device employing a plurality of tubes receiving inputs which are to be added at their grids and having their anodes connected in parallel to produce the addition in a single output load. Of this plurality of tubes a single tube 280 is used for injecting the signal from gate 24 and four tubes 281 through 284 are paralleled for injecting the noise from generator 30, via amplifier 31, it having been determined that this greater noise injection capability is required to reach the low signal-to-noise ratio encountered in a typical radar system, and also due to the fact that for a given rms voltage the noise peak voltages are greater than those of a sine wave.

The grid of tube 280 is connected to the signal input terminal 285 by attenuator 28 which includes potentiometer 286. This attenuator controls the amplitude of the signal delivered to tube 280. The grids of tubes 281 through 284 are connected to the noise input terminal 287 by a coupling circuit which includes potentiometer 288.

The noise generator 30 can be a conventional device, of which several are obtainable commercially, or it can be any noise generator, such as a gas tube operative to produce random noise.

The tubes 280 through 284 are provided with filtered d.c. for the anodes and screens, with additional resistors such as 289 and 290, typified for tube 280, for all of the tubes to provide suppression of parasitic oscillations. Grid resistors, such as 291, are desirable for the same reason, for the paralleled noise tubes 281 through 284. Summing resistor 292 is connected in the anode circuits of all the tubes 280 through 284.

Output signals developed across resistance 292 are applied by a coupling circuit, which includes capacitance 293, to output terminal 32. Terminal 32 would normally be connected to a coaxial cable which would lead to the signal processing apparatus of the radar system.

As with the previous circuitry, it is frequently desired that the adder be operated for testing purposes without a coaxial cable connection. To this end a matching load 295 is provided which can be shunted across the output terminal to ground by switch 294.

At this point it is considered to be appropriate to emphasize that the satisfactory operation of the acceleration gate radar system will be related to the adjustments which can be made by using the simulator of this invention. For this reason the component parts should be critically chosen as to type and to tolerance and careful attention should be given to lead lengths and wiring layout to insure a uniformity of response throughout the operating frequency range.

In summary, there has been disclosed apparatus for generating a signal which can be used in adjusting an acceleration gate radar system. In brief, the sawtooth signal generated in component 12 is sequentially modified in a manner related to anticipated missile flight patterns by the components 16, 17 and 20. After compensation for oscillator nonlinearity in linearizer 18, the modified signal is used to frequency modulate the output of oscillator 19. When related to the radar set disclosed in copending applications, the output of oscillator 19 would be in the 13.4 to 20.5 megacycle range. Components 21, 22 and 23 limit the amplitude and reduce the frequency range of the signal, typically to the range of 0.4 to 7.5 megacycles. The signal is next transformed, by gate 24, into 240 microsecond duration pulses synchronized with and suitably delayed from the 180 cycle per second radar transmitter pulse. The simulator output signal consists of these 180 per second, 240 microsecond duration pulses of 0.4 to 7.5 megacycle signal, suitably buried in random noise. The output signal is intended to be used as a testing input signal, and to simulate the actual signal input, to the analysis section of the acceleration gate of the radar system.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. Apparatus for producing a test signal comprising:
    generator means for producing a signal of varying frequency;
    gating means connected to said generator means for alternatively delivering and blocking said varying frequency signal;
    noise generating means for generating random noise, and
    adding means connected to said gating and to said noise generating means for burying said delivered varying frequency signal in said random noise to form said test signal.

2. Apparatus as set forth in claim 1 wherein said generator means includes a frequency modulated oscillator and function means connected to said oscillator to sequentially and repetitively modulate the output frequency of said oscillator according to predetermined patterns.

3. Apparatus to be used in testing a pulse transmitter radar system comprising:

generator means for producing a varying frequency signal simulating the reflected signal received by the radar system from a target moving in predetermined flight patterns;

gating means connected to said generator means for alternately delivering and blocking said varying frequency signal;

noise generating means for generating random noise, and adding means connected to said gating and to said noise generating means for burying said delivered varying frequency signal in said random noise to form a signal suitable for testing a radar system.

4. Apparatus as set forth in claim 3 wherein the periods for alternately delivering and blocking said varying frequency signal are related to the frequency of the radar transmitter pulse.

5. Apparatus as set forth in claim 4 wherein said generator means includes a frequency modulated oscillator and function generator means connected to said oscillator to sequentially and repetitively modulate the output frequency of said oscillator to simulate the reflected signal which would be received by the radar system from a target in different, predetermined flight patterns.

6. Apparatus to be used in testing an acceleration gate radar system comprising:

generator means producing a signal related in frequency to the operational characteristics of said acceleration gate;

distorting means connected to said generating means to sequentially and repetitively distort said signal;

oscillator means operatively connected to be frequency modulated in response to said distorted signal, said distorted signal causing the output of said frequency modulated oscillator to simulate the reflected signals which would be received by the radar system from a target in different, predetermined flight patterns;

gating means connected to said oscillator means for alternately delivering and blocking the frequency modulated output of said oscillator means;

noise generating means for generating random noise, and adding means connected to said gating and to said noise generating means for burying said delivered frequency modulated oscillator output in said random noise to form a signal suitable for testing the acceleration gate section of said radar system.

7. Apparatus as set forth in claim 6 wherein said radar system includes a pulses transmitter and the frequency of the periods when said gating means delivers the modulated output of said oscillator is related to the frequency of the transmitter pulses.

8. Apparatus as set forth in claim 7 and further including gate timer means connected to said gating means for sequentially and repetitively varying the time relationship between the transmitter pulses and the periods when said gating means delivers the modulated output of said oscillator.

9. Apparatus as set forth in claim 8 wherein said distorting means includes a plurality of circuits having different, nonlinear, input-output voltage characteristics and switching means which sequentially connect one of said plurality of circuits to said generator means.

10. Apparatus as set forth in claim 9 wherein each one of said plurality of circuits includes a plurality of parallel connected branch circuits, each branch circuit including a variable resistance connected to a diode.

* * * * *